United States Patent
Miyawaki

(10) Patent No.: US 12,151,715 B2
(45) Date of Patent: Nov. 26, 2024

(54) VEHICLE DRIVING SUPPORT DEVICE

(71) Applicant: TOYOTA JIDOSHA KABUSHIKI KAISHA, Toyota (JP)

(72) Inventor: Jiro Miyawaki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 304 days.

(21) Appl. No.: 17/954,796

(22) Filed: Sep. 28, 2022

(65) Prior Publication Data
US 2023/0127678 A1   Apr. 27, 2023

(30) Foreign Application Priority Data
Oct. 21, 2021   (JP) .................... 2021-172131

(51) Int. Cl.
*B60W 60/00*   (2020.01)
*B60W 30/12*   (2020.01)
*B62D 6/00*   (2006.01)

(52) U.S. Cl.
CPC ........ *B60W 60/0051* (2020.02); *B60W 30/12* (2013.01); *B60W 60/001* (2020.02); *B62D 6/00* (2013.01)

(58) Field of Classification Search
CPC ............. B60W 60/0051; B60W 30/12; B60W 60/001; B60W 30/18163; B60W 60/0015; B62D 6/00; B62D 6/007; B62D 15/025
See application file for complete search history.

(56) References Cited

U.S. PATENT DOCUMENTS

2009/0171533 A1\* 7/2009 Kataoka ............... B62D 15/025
                                                                   701/41
2018/0141588 A1    5/2018 Shimizu

FOREIGN PATENT DOCUMENTS

| JP | 2007-326447 A | 12/2007 |
| JP | 2015-189404 A | 11/2015 |
| WO | 2017/022474 A1 | 2/2017 |

\* cited by examiner

*Primary Examiner* — Yuen Wong
(74) *Attorney, Agent, or Firm* — Sughrue Mion, PLLC

(57) ABSTRACT

During execution of lane keeping control, a vehicle driving support device sets a center line passing through a center of a travelable width of an own vehicle within a current lane as a target traveling line, and autonomously steers the own vehicle such that a reference point of the own vehicle moves along the target traveling line. The vehicle driving support device changes a position of the target traveling line such that the target traveling line is a line located between the center line and the reference point of the own vehicle, when a driver performs a steering operation for steering the own vehicle during the execution of the lane keeping control and a steering operation force of the driver becomes equal to or larger than a target change start threshold value.

2 Claims, 8 Drawing Sheets

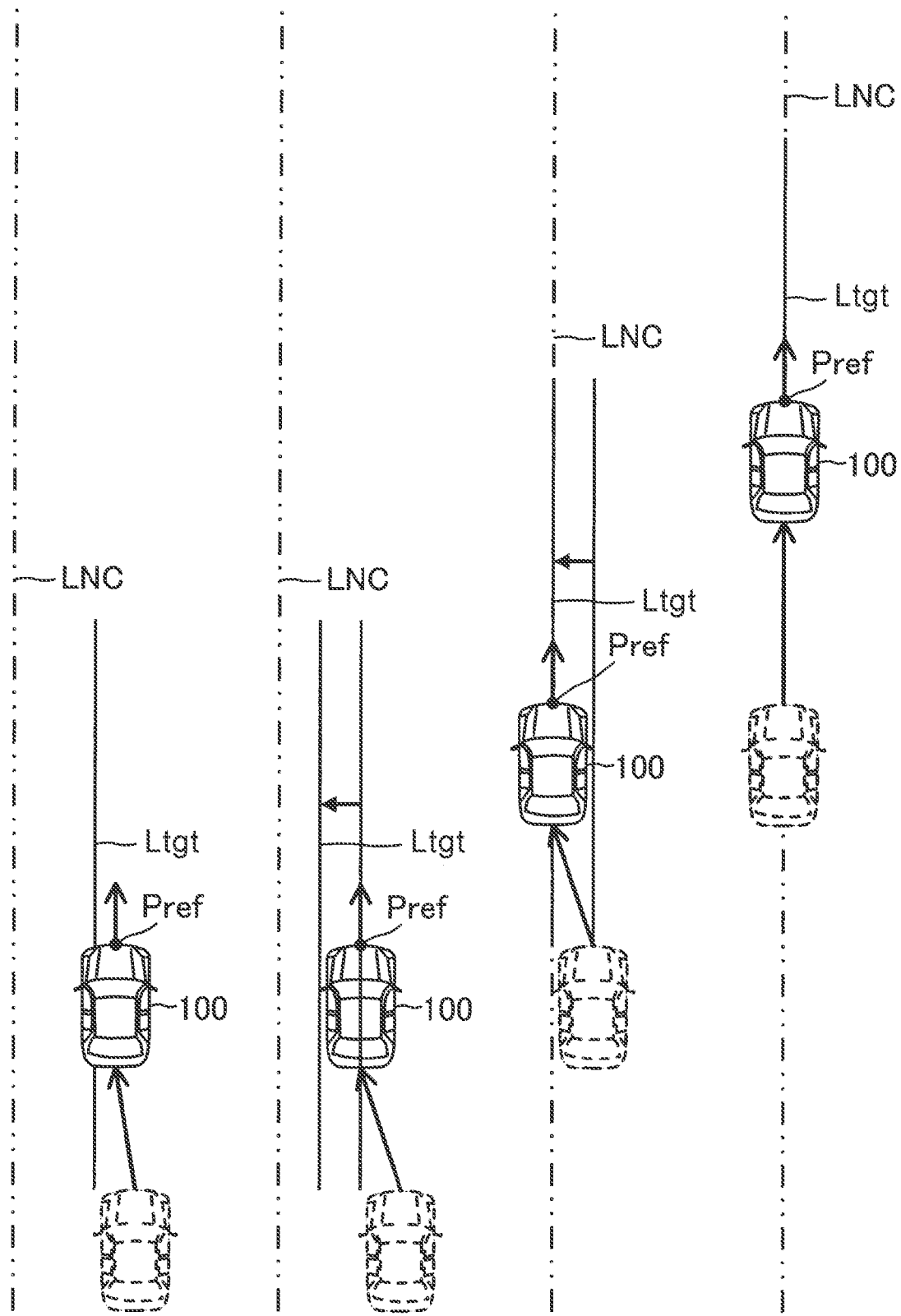

VEHICLE DRIVING SUPPORT DEVICE

CROSS-REFERENCE TO RELATED APPLICATION

This application claims priority to Japanese Patent Application No. 2021-172131 filed on Oct. 21, 2021, incorporated herein by reference in its entirety.

BACKGROUND

1. Technical Field

The present disclosure relates to a vehicle driving support device.

2. Description of Related Art

There is known a vehicle driving support device that executes lane keeping control that autonomously steers an own vehicle so that the own vehicle travels within the lane. Such a vehicle driving support device generally sets a target traveling line in the center of the current lane during execution of the lane keeping control, and autonomously steers the own vehicle so that the own vehicle travels along the target traveling line. However, during the execution of the lane keeping control, the driver may wish to cause the own vehicle to travel at a position on the right side or a position on the left side of the target traveling line. At this time, while the driver is causing the own vehicle to travel at a position on the right side or a position on the left side of the target traveling line, steering force due to the lane keeping control is applied to the own vehicle, so that it is necessary to keep applying a relatively large steering operation force to the steering wheel, which is a burden on the driver.

In view of this, there is known a vehicle driving support device that, when it is detected that the driver wishes to cause the own vehicle to travel at a position on the right side or a position on the left side of the target traveling line during the execution of the lane keeping control, estimates a position (desired position) at which the driver wishes to cause the own vehicle to travel and changes the position of the target traveling line to the desired position (see, for example, WO 2017-022474).

SUMMARY

In the case where the position of the target traveling line is changed to the desired position of the driver when it is detected that the driver wishes to cause the own vehicle to travel at a position on the right side or a position on the left side of the target traveling line set in the center of the current lane, the steering operation force that the driver must apply to the steering wheel when the own vehicle is traveling at the desired position of the driver becomes too small, which makes it difficult for the driver to recognize whether the lane keeping control is being executed.

An object of the present disclosure is to provide a vehicle driving support device that can make it easier for the driver to recognize that the lane keeping control is being executed when the driver is causing the own vehicle to travel at a position on the right side or a position on the left side of the target traveling line during the execution of the lane keeping control, and that can also relatively reduce the steering operation force required of the driver.

A vehicle driving support device according to the present disclosure executes lane keeping control in which an own vehicle is autonomously steered such that the own vehicle travels within a current lane. The vehicle driving support device according to the present disclosure is a device that, during execution of the lane keeping control, sets a center line passing through a center of a travelable width of the own vehicle within the current lane as a target traveling line, and that autonomously steers the own vehicle such that a reference point of the own vehicle moves along the target traveling line. The vehicle driving support device according to the present disclosure is configured to change a position of the target traveling line such that the target traveling line is a line located between the center line and the reference point of the own vehicle, when a driver performs a steering operation for steering the own vehicle during the execution of the lane keeping control and a steering operation force of the driver becomes equal to or larger than a target change start threshold value.

When the own vehicle is autonomously steered by lane keeping control so that the own vehicle travels with the center line as the target traveling line, the driver may wish to cause the own vehicle to travel at a position on the right side or a position on the left side of the target traveling line. At this time, if the state in which the target traveling line coincides with the center line is maintained, the driver's steering operation force that is required when the own vehicle is caused to travel straight at a position desired by the driver is large, which will put a burden on the driver.

According to the present disclosure, when the own vehicle is laterally moved from the target traveling line by the driver during the execution of the lane keeping control, the target traveling line moves from the center line in the same direction, so that the driver's steering operation force that is required when the own vehicle is caused to travel straight at a position desired by the driver becomes smaller. Further, when the own vehicle is caused to travel straight at the position desired by the driver, the target traveling line is set between the center line and the reference point of the own vehicle. At this time, since the steering force is applied to the own vehicle to some extent due to the lane keeping control, the driver can easily recognize that the lane keeping control is being executed.

Therefore, the present disclosure can make it easier for the driver to recognize that the lane keeping control is being executed when the driver is causing the own vehicle to travel at a position on the right side or a position on the left side of the center line during the execution of the lane keeping control, and can also relatively reduce the steering operation force required of the driver.

The vehicle driving support device according to the present disclosure may be configured to change the position of the target traveling line such that the target traveling line coincides with the center line, when the steering operation force of the driver becomes equal to or larger than the target change start threshold value, a change of the position of the target traveling line is started, and then the steering operation force of the driver becomes equal to or smaller than a target change end threshold value.

When the own vehicle is caused to travel at a position on the right side or a position on the left side of the target traveling line during the execution of the lane keeping control, the driver may wish to cause the own vehicle to travel at a position of the center line.

According to the present disclosure, the position of the target traveling line is returned to the position of the center line utilizing the decrease in the steering operation force of the driver when the driver steers the own vehicle in an attempt to cause the own vehicle to travel at the position of the center line. Therefore, when the driver wishes to cause the own vehicle to travel at the position of the center line, the own vehicle can be caused to travel at the position of the center line.

Further, the vehicle driving support device according to the present disclosure may be configured to stop changing the position of the target traveling line and hold the position of the target traveling line at a position at a time when the steering operation force decreases to a target holding start threshold value, when the steering operation force of the driver becomes equal to or larger than the target change start threshold value, a change of the position of the target traveling line is started, and then the steering operation force decreases to the target holding start threshold value.

In the case where the steering operation force of the driver becomes equal to or larger than the target change start threshold value during the execution of the lane keeping control and the position of the target traveling line is changed toward the reference point of the own vehicle, when the own vehicle reaches a position desired by the driver and caused to travel straight, the steering operation force of the driver starts to decrease. This makes it possible to recognize whether the own vehicle has reached a position desired by the driver based on the steering operation force of the driver.

According to the present disclosure, when the steering operation force of the driver becomes equal to or larger than the target change start threshold value, the change of the position of the target traveling line is started, and then the steering operation force decreases to the target holding start threshold value, the change of the position of the target traveling line is stopped and the position of the target traveling line is maintained at the position at that time. This makes it possible to set an appropriate target traveling line as the target traveling line when the own vehicle reaches a position desired by the driver.

Further, the vehicle driving support device according to the present disclosure may be configured to change the position of the target traveling line such that the target traveling line coincides with the center line, in a case where the steering operation force becomes equal to or smaller than a target change end threshold value that is set to a value smaller than the target holding start threshold value when the steering operation force decreases to the target holding start threshold value and the position of the target traveling line is held at the position at a time when the steering operation force decreases to the target holding start threshold value.

When the own vehicle is caused to travel at a position on the right side or a position on the left side of the target traveling line during the execution of the lane keeping control, the driver may wish to cause the own vehicle to travel at a position of the center line.

According to the present disclosure, the position of the target traveling line is returned to the position of the center line utilizing the decrease in the steering operation force of the driver when the driver steers the own vehicle in an attempt to cause the own vehicle to travel at the position of the center line. Therefore, when the driver wishes to cause the own vehicle to travel at the position of the center line, the own vehicle can be caused to travel at the position of the center line.

The components of the present disclosure are not limited to the embodiment of the present disclosure described later with reference to the drawings. Other objects, other features, and accompanying advantages of the present disclosure will be readily understood from the description of the embodiment of the present disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5A is a diagram showing a scene in which the own vehicle moves to a position shifted to the left side from a position desired by the driver during the execution of the lane keeping control, but the driver steering torque is larger than the target change end threshold value;

FIG. 5B is a diagram showing a scene in which the own vehicle moves to a position shifted to the left side from the position desired by the driver during the execution of the lane keeping control, and the driver steering torque becomes equal to or smaller than the target change end threshold value so that the position of the target traveling line is changed;

FIG. 5C shows a scene in which the own vehicle reaches the center line during the execution of the lane keeping control and the position of the target traveling line is changed;

FIG. 5D is a diagram showing a scene in which the change of the position of the target traveling line is completed during the execution of the lane keeping control and the own vehicle is traveling at a position of a lane center line;

DETAILED DESCRIPTION OF EMBODIMENTS

Figure 1:
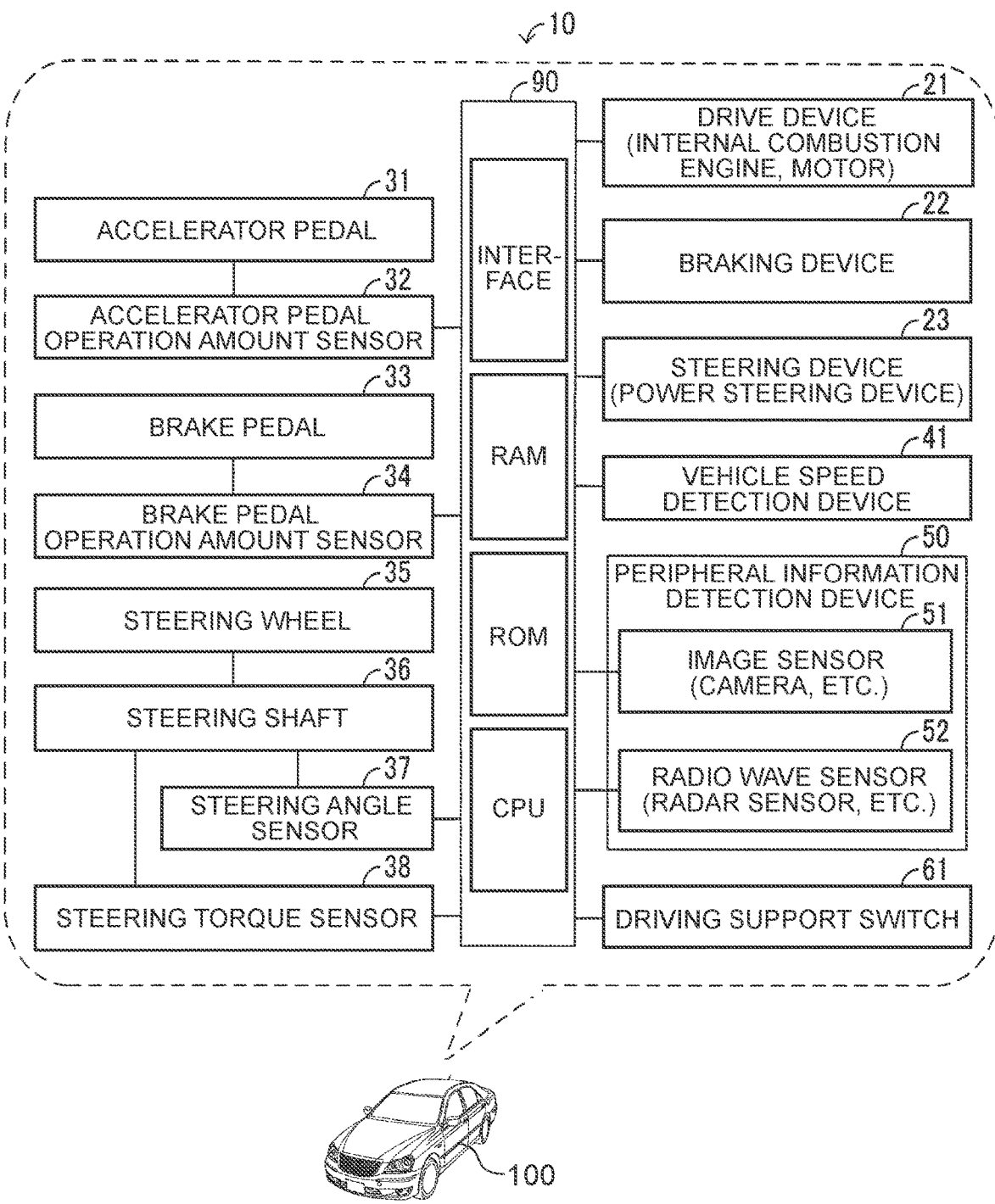
FIG. 1 is a diagram showing a vehicle driving support device according to an embodiment of the present disclosure and a vehicle (an own vehicle) on which the device is mounted.

Hereinafter, a vehicle driving support device according to an embodiment of the present disclosure will be described with reference to the drawings. As shown in FIG. 1, a vehicle driving support device 10 according to the embodiment of the present disclosure is mounted on an own vehicle 100.

ECU

The vehicle driving support device 10 includes an ECU 90 as a control device. The term ECU is an abbreviation for electronic control unit. The ECU 90 includes a microcomputer as a main part. The microcomputer includes a central processing unit (CPU), a read-only memory (ROM), a random access memory (RAM), a non-volatile memory, an interface, and the like. The CPU realizes various functions by executing instructions, programs, or routines stored in the ROM.

Drive Device, Etc.

The own vehicle 100 is equipped with a drive device 21, a braking device 22, and a steering device 23.

Drive Device

The drive device 21 is a device that outputs a driving torque (driving force) applied to the own vehicle 100 in order to cause the own vehicle 100 to travel, and is, for example, an internal combustion engine, a motor, or the like. The drive device 21 is electrically connected to the ECU 90. The ECU 90 can control the driving torque output from the drive device 21 by controlling the operation of the drive device 21.

Braking Device

The braking device 22 is a device that outputs a braking torque (braking force) applied to the own vehicle 100 in order to brake the own vehicle 100. The braking device 22 is electrically connected to the ECU 90. The ECU 90 can control the braking torque output from the braking device 22 by controlling the operation of the braking device 22.

Steering Device

The steering device 23 is a device that outputs a steering torque (steering force) applied to the own vehicle 100 in order to steer the own vehicle 100, and is, for example, a power steering device. The steering device 23 is electrically connected to the ECU 90. The ECU 90 can control the steering torque output from the steering device 23 by controlling the operation of the steering device 23.

Sensors, Etc.

An accelerator pedal 31, an accelerator pedal operation amount sensor 32, a brake pedal 33, a brake pedal operation amount sensor 34, a steering wheel 35, a steering shaft 36, a steering angle sensor 37, a steering torque sensor 38, a vehicle speed detection device 41, a peripheral information detection device 50, and a driving support switch 61 are also mounted on the own vehicle 100.

Accelerator Pedal Operation Amount Sensor

The accelerator pedal operation amount sensor 32 is a sensor that detects the operation amount of the accelerator pedal 31, and is electrically connected to the ECU 90. The accelerator pedal operation amount sensor 32 transmits information of the detected operation amount of the accelerator pedal 31 to the ECU 90. The ECU 90 acquires the operation amount of the accelerator pedal 31 (accelerator pedal operation amount) based on the information. The ECU 90 acquires a required driving torque (required driving force) by calculation based on the accelerator pedal operation amount and the vehicle speed (own vehicle speed) of the own vehicle 100. The required driving torque is the driving torque required to be output from the drive device 21. The ECU 90 controls the operation of the drive device 21 so that the required driving torque is output.

Brake Pedal Operation Amount Sensor

The brake pedal operation amount sensor 34 is a sensor that detects the operation amount of the brake pedal 33, and is electrically connected to the ECU 90. The brake pedal operation amount sensor 34 transmits information of the detected operation amount of the brake pedal 33 to the ECU 90. The ECU 90 acquires the operation amount of the brake pedal 33 (brake pedal operation amount) based on the information. The ECU 90 acquires the required braking torque (required braking force) by calculation based on the brake pedal operation amount. The required braking torque is the braking torque required to be output from the braking device 22. The ECU 90 controls the operation of the braking device 22 so that the required braking torque is output.

Steering Angle Sensor

The steering angle sensor 37 is a sensor that detects the rotation angle of the steering shaft 36 with respect to the neutral position, and is electrically connected to the ECU 90. The steering angle sensor 37 transmits information of the detected rotation angle of the steering shaft 36 to the ECU 90. The ECU 90 acquires the rotation angle of the steering shaft 36 (steering angle $\theta$) based on the information.

Steering Torque Sensor

The steering torque sensor 38 is a sensor that detects the torque input to the steering shaft 36 by the driver via the steering wheel 35, and is electrically connected to the ECU 90. The steering torque sensor 38 transmits the detected torque information to the ECU 90. The ECU 90 acquires the torque (driver steering torque TQ_D or steering operation force) input to the steering shaft 36 by the driver DR via the steering wheel 35 based on the information.

Vehicle Speed Detection Device

The vehicle speed detection device 41 is a device that detects the vehicle speed (own vehicle speed) of the own vehicle 100, and is, for example, a wheel speed sensor. The vehicle speed detection device 41 is electrically connected to the ECU 90. The vehicle speed detection device 41 transmits information of the detected vehicle speed of the own vehicle 100 to the ECU 90. The ECU 90 acquires the vehicle speed (own vehicle speed V) of the own vehicle 100 based on the information.

The ECU 90 acquires the driver-required steering torque by calculation based on the steering angle $\theta$, the driver steering torque TQ_D, and the own vehicle speed V. The driver-required steering torque is the steering torque required to be output from the steering device 23. The ECU 90 controls the operation of the steering device 23 so that the driver-required steering torque is output from the steering device 23 when the lane keeping control described later is not being executed.

Peripheral Information Detection Device

The peripheral information detection device 50 is a device that detects information of the periphery of the own vehicle 100, and in this example, includes an image sensor 51 and a radio wave sensor 52. The image sensor 51 is, for example, a camera. The radio wave sensor 52 is, for example, a radar sensor (millimeter wave radar or the like). The peripheral information detection device 50 may include a sound wave sensor such as an ultrasonic sensor (clearance sonar) or an optical sensor such as a laser radar (LiDAR).

Image Sensor

The image sensor 51 is electrically connected to the ECU 90. The image sensor 51 captures an image of the periphery of the own vehicle 100 and transmits information related to the captured image to the ECU 90. The ECU 90 can acquire information (peripheral detection information IS) about the periphery of the own vehicle 100 based on the information (image information).

Radio Wave Sensor

The radio wave sensor 52 is electrically connected to the ECU 90. The radio wave sensor 52 transmits radio waves and receives radio waves (reflected waves) reflected by an object. The radio wave sensor 52 transmits information (detection result) related to the transmitted radio waves and the received radio waves (reflected waves) to the ECU 90. In other words, the radio wave sensor 52 detects an object existing in the periphery of the own vehicle 100, and transmits information (detection result) related to the detected object to the ECU 90. The ECU 90 can acquire information (peripheral detection information IS) related to the object existing in the periphery of the own vehicle 100 based on the information (radio wave information).

Driving Support Switch

The driving support switch 61 is a switch for allowing the driver to select whether to execute the lane keeping control described later, and is electrically connected to the ECU 90. When the driving support switch 61 is operated in the ON state, the ECU 90 determines that the execution of the lane keeping control is requested. On the other hand, when the driving support switch 61 is operated in the OFF state, the ECU 90 determines that the execution of the lane keeping control is no longer required.

Outline of Operation of Vehicle Driving Support Device

Next, the outline of the operation of the vehicle driving support device 10 will be described. In the following description, "left" represents the left side with respect to the traveling direction of the own vehicle 100, and "right" represents the right side with respect to the traveling direction of the own vehicle 100.

Figure 2A:
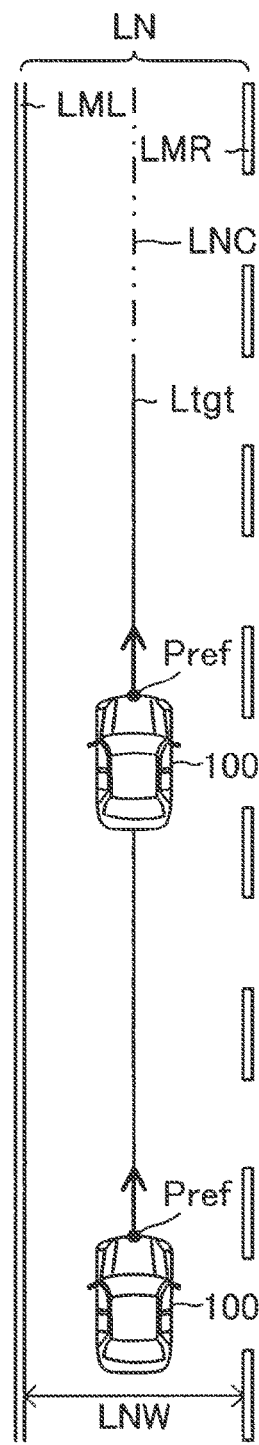
FIG. 2A is a diagram showing a scene in which steering torque is controlled so that the own vehicle travels on a target traveling line by lane keeping control.

As shown in FIG. 2A, the vehicle driving support device 10 is configured to execute the lane keeping control in which the own vehicle 100 is autonomously steered so that the reference point (own vehicle reference point Pref) of the own vehicle 100 moves on the target traveling line Ltgt. The own vehicle reference point Pref only needs to be a point indicating the position of the own vehicle 100, and in this example, is a position on the front end portion of the own vehicle 100 and is a position at the center in the width direction of the own vehicle 100.

The vehicle driving support device 10 sets a line (center line) passing through the center of the width in which the own vehicle 100 can travel (travelable width of the own vehicle 100) as the target traveling line Ltgt. In this example, the vehicle driving support device 10 acquires the lane marking on the left side (left lane marking LML) and the lane marking on the right side (right lane marking LMR) of the own vehicle 100 based on the peripheral detection information IS, acquires the distance (lane width LNW) between the left lane marking LML and the right lane marking LMR, adopts the lane width LNW as the travelable width of the own vehicle 100, and sets the line passing through the center of the lane width LNW (lane center line LNC) as the target traveling line Ltgt. The lane center line LNC is a line extending along the center of the width of the current lane LN along the current lane LN. The current lane LN is the lane (traveling lane) in which the own vehicle 100 is traveling.

Figure 2B:
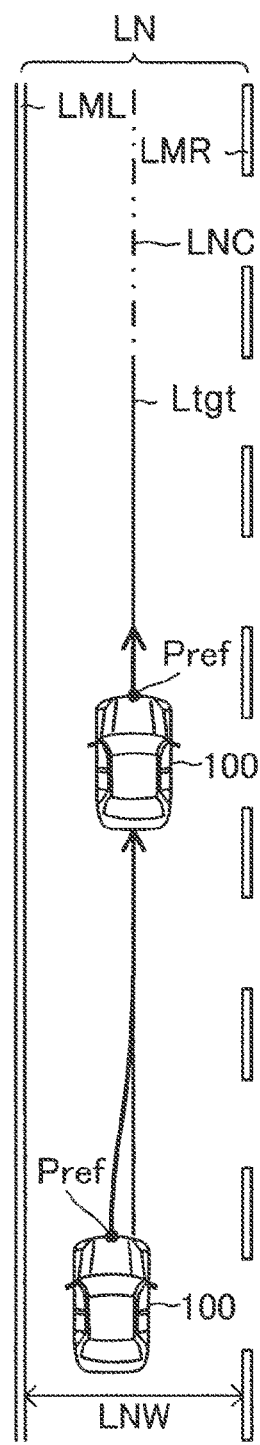
FIG. 2B is a diagram showing a scene in which the steering torque is controlled so that the own vehicle deviating to the left side from the target traveling line is steered to the right side by the lane keeping control and travels on the target driving line.

As shown in FIG. 2B, when the own vehicle reference point Pref deviates to the left side from the target traveling line Ltgt during the execution of the lane keeping control, the vehicle driving support device 10 autonomously steers the own vehicle 100 so that the own vehicle 100 moves to the right side and the own vehicle reference point Pref moves on the target traveling line Ltgt.

More specifically, the vehicle driving support device 10 acquires the distance (deviation amount D) between the own vehicle reference point Pref and the target traveling line Ltgt based on the peripheral detection information IS, and when the deviation amount D is larger than zero and the own vehicle reference point Pref is located on the left side of the target traveling line Ltgt, the vehicle driving support device 10 calculates the steering torque for moving the own vehicle 100 to the right side according to the deviation amount D, and causes the steering device 23 to output a steering torque corresponding to the calculated steering torque (system steering torque TQ_S).

Figure 2C:
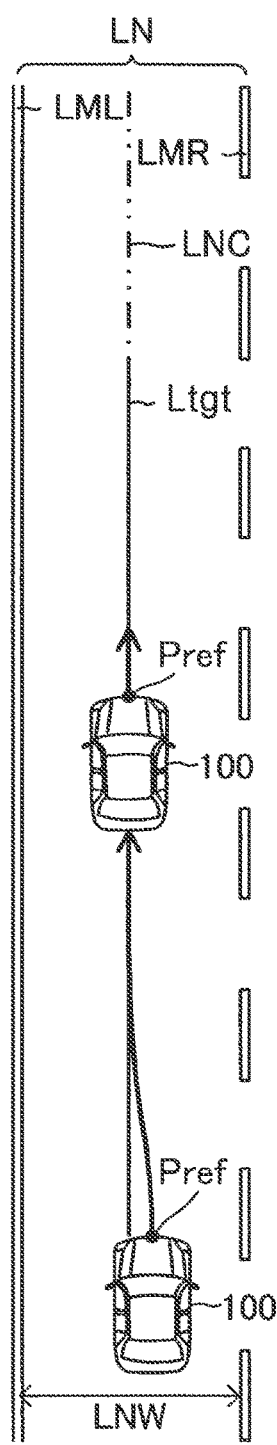
FIG. 2C is a diagram showing a scene in which the steering torque is controlled so that the own vehicle deviating to the right side from the target traveling line is steered to the left side by the lane keeping control and travels on the target traveling line.

On the other hand, as shown in FIG. 2C, when the own vehicle reference point Pref deviates to the right side from the target traveling line Ltgt during the execution of the lane keeping control, the vehicle driving support device 10 autonomously steers the own vehicle 100 so that the own vehicle 100 moves to the left side and the own vehicle reference point Pref moves on the target traveling line Ltgt.

More specifically, the vehicle driving support device 10 acquires the deviation amount D based on the peripheral detection information IS, and when the deviation amount D is larger than zero and the own vehicle reference point Pref is located on the right side of the target traveling line Ltgt, the vehicle driving support device 10 calculates the steering torque for moving the own vehicle 100 to the left side according to the deviation amount D, and causes the steering device 23 to output a steering torque corresponding to the calculated steering torque (system steering torque TQ_S).

Accordingly, the own vehicle 100 travels so that the own vehicle reference point Pref moves along the target traveling line Ltgt during the execution of the lane keeping control.

Figure 3:
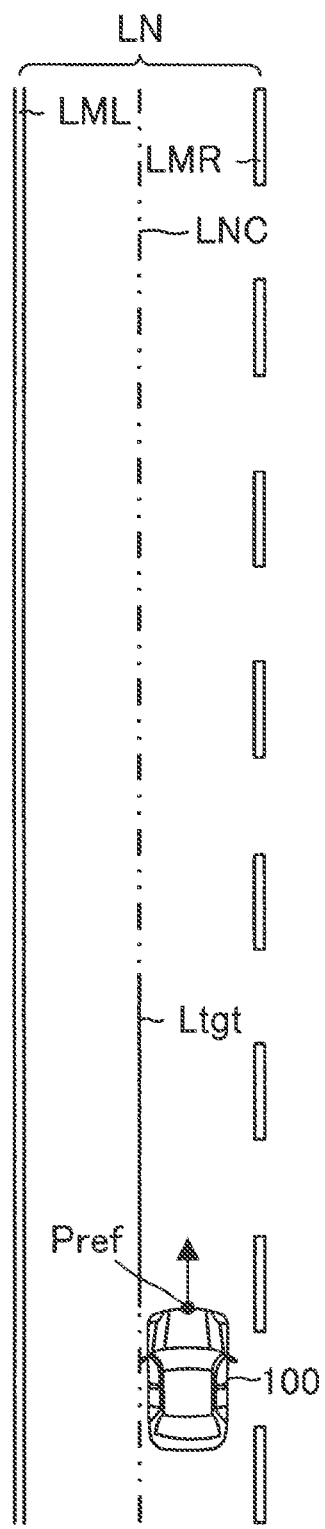
FIG. 3 is a diagram showing a scene in which the own vehicle is traveling on the right side of the target traveling line.

However, when the target traveling line Ltgt is set to the lane center line LNC and the lane keeping control is being executed so that the own vehicle 100 travels along the target traveling line Ltgt, as shown in FIG. 3, the driver may wish to cause the own vehicle 100 to travel at a position on the right side of the target traveling lane Ltgt, or the driver may wish to cause the own vehicle 100 to travel at a position on the left side of the target traveling lane Ltgt.

When the driver attempts to cause the own vehicle 100 to travel at a position on the right side of the target traveling line Ltgt during the execution of the lane keeping control, the driver inputs a clockwise steering torque to the steering wheel 35. The own vehicle 100 thus moves to the right side of the target traveling line Ltgt, but at that time, the deviation amount D becomes larger than zero, so that the vehicle driving support device 10 inputs the counterclockwise system steering torque TQ_S to the steering shaft 36 in order to make the deviation amount D zero. Therefore, in an attempt to move the own vehicle 100 further to the right side, the driver needs to input a larger clockwise steering torque to the steering wheel 35.

In this way, when the driver is moving the own vehicle 100 to the right side from the target traveling line Ltgt during the execution of the lane keeping control, the deviation amount D gradually increases, so that the system steering torque TQ_S (counterclockwise steering torque) also gradually increases, and as a result, the driver steering torque TQ_D (clockwise steering torque) also gradually increases.

This also applies equally when the driver causes the own vehicle 100 to travel at a position on the left side of the target traveling line Ltgt.

Accordingly, when the driver moves the own vehicle 100 laterally to a desired position to cause the own vehicle 100 to travel, the steering torque that the driver needs to input to the steering wheel 35 in order to cause the own vehicle 100 to travel straight at the desired position (driver steering torque TQ_D) becomes very relatively large, which is not preferable.

Therefore, when it is predicted that the driver wishes to cause the own vehicle 100 to travel at a position on the right side or a position on the left side of the target traveling line Ltgt during the execution of the lane keeping control, the vehicle driving support device 10 changes the position of the target traveling line Ltgt as follows.

The vehicle driving support device 10 monitors the value of the driver steering torque TQ_D during the execution of the lane keeping control, and when the driver steering torque TQ_D is smaller than a predetermined value (target change start threshold value TQ_C), the vehicle driving support device 10 maintains the position of the target traveling line Ltgt (original target traveling line Ltgt) that is set at that time.

Figures 4A, 4B, 4C, 4D:
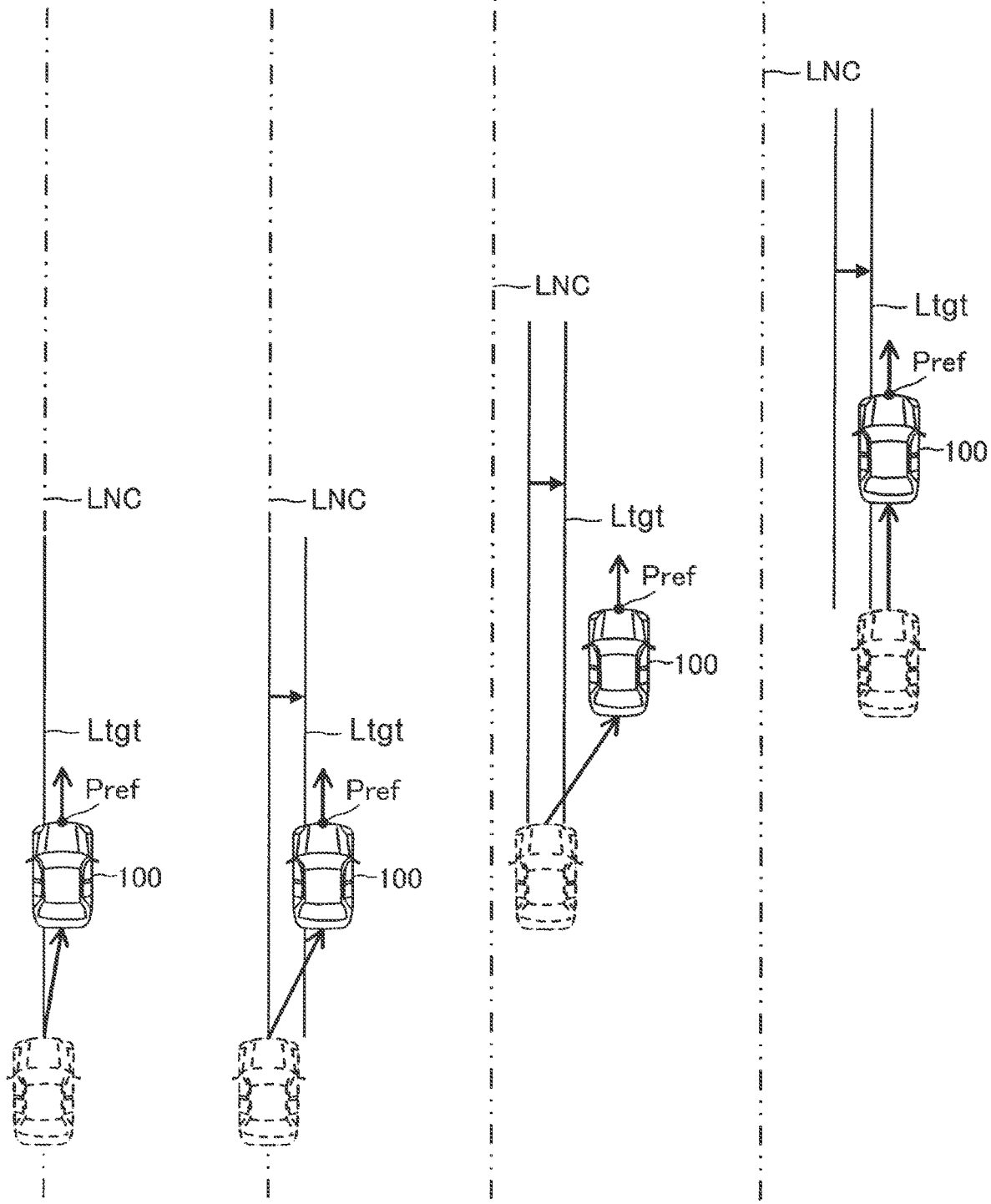
FIG. 4A is a diagram showing a scene in which the own vehicle moves to a position shifted to the right side from the target traveling line during the execution of the lane keeping control, but driver steering torque is smaller than a target change start threshold value.
FIG. 4B is a diagram showing a scene in which the own vehicle moves to a position shifted to the right side from the target traveling line during the execution of the lane keeping control, and the driver steering torque becomes equal to or larger than the target change start threshold value so that the position of the target traveling line is changed.
FIG. 4C shows a scene in which the own vehicle shifts to the right side from the target traveling line during the execution of the lane keeping control to reach a position desired by the driver and the position of the target traveling line is changed.
FIG. 4D is a diagram showing a scene in which the change of the position of the target traveling line is completed during the execution of the lane keeping control and the own vehicle is traveling at a position desired by the driver.

For example, as shown in FIG. 4A, when the deviation amount D is relatively small and the driver steering torque TQ_D is smaller than the target change start threshold value TQ_C, the vehicle driving support device 10 maintains the position of the target traveling line Ltgt at the lane center line LNC.

In the present specification, unless otherwise specified, the driver steering torque TQ_D means the absolute value (magnitude) of the driver steering torque TQ_D.

On the other hand, when the driver steering torque TQ_D increases and reaches the target change start threshold value TQ_C, the vehicle driving support device 10 starts changing the position of the target traveling line Ltgt. In this case, the vehicle driving support device 10 changes the position of the target traveling line Ltgt so that the target traveling line Ltgt gradually moves so as to approach the own vehicle reference point Pref.

For example, as shown in FIG. 4B, when the own vehicle 100 moves to the right side from the target traveling line Ltgt, the deviation amount D becomes relatively large, and the driver steering torque TQ_D reaches the target change start threshold value TQ_C, the vehicle driving support device 10 starts changing the position of the target traveling line Ltgt, and changes the position of the target traveling line Ltgt so that the target traveling line Ltgt gradually moves toward the own vehicle reference point Pref.

At this time, the vehicle driving support device 10 changes the position of the target traveling line Ltgt so that the target traveling line Ltgt is located between the lane center line LNC (original target traveling line Ltgt) and the own vehicle reference point Pref.

More specifically, the vehicle driving support device 10 acquires the distance between the lane center line LNC and the own vehicle reference point Pref (own vehicle separation distance) from the peripheral detection information IS, and sets a position away from the lane center line LNC toward the own vehicle reference point Pref by a distance of a predetermined ratio of the own vehicle separation distance as the target position, and changes the position of the target traveling line Ltgt so that the target traveling line Ltgt reaches the target position. In other words, the vehicle driving support device 10 acquires the own vehicle separation distance from the peripheral detection information IS, and sets a position away from the lane center line LNC toward the own vehicle reference point Pref by a distance obtained by multiplying the own vehicle separation distance by a coefficient smaller than "1" as the target position, and changes the position of the target traveling line Ltgt so that the target traveling line Ltgt reaches the target position.

At this time, the vehicle driving support device 10 sets an appropriate speed (predetermined change speed) as a speed for changing the position of the target traveling line Ltgt, and changes the position of the target traveling line Ltgt at the predetermined change speed. The vehicle driving support device 10 changes the predetermined change speed according to a parameter such as a change speed of a distance between the lane center line LNC and the own vehicle reference point Pref (own vehicle separation distance), for example. More specifically, for example, the vehicle driving support device 10 filters parameters such as the change speed of the distance between the lane center line LNC and the own vehicle reference point Pref (own vehicle separation distance) by a primary filter, a time variable filter, or the like, to set the predetermined change speed.

Further, at this time, the vehicle driving support device 10 may set an upper limit value of the predetermined change speed, and when the predetermined change speed is larger than the upper limit value, the vehicle driving support device 10 may limit the predetermined change speed to the upper limit value. For example, the vehicle driving support device 10 may limit the predetermined change speed so that the inclination (gradient) of the change in the position of the target traveling line Ltgt with respect to the time axis is equal to or less than a certain inclination. That is, the predetermined change speed may be set so that the shape of the change locus of the position of the target traveling line Ltgt with respect to the time axis becomes a predetermined shape.

Even while the position of the target traveling line Ltgt is being changed in this way, the vehicle driving support device 10 causes the steering device 23 to output the system steering torque TQ_S according to the deviation amount D between the target traveling line Ltgt that is being changed and the own vehicle reference point Pref.

Finally, when the own vehicle 100 moves laterally to the desired position of the driver and the driver returns the steering wheel 35 to the neutral position and holds it at that position, the target traveling line Ltgt approaches the own vehicle reference point Pref, the deviation amount D gradually decreases, and the system steering torque TQ_S gradually decreases, so that the driver steering torque TQ_D also gradually decreases, and eventually a predetermined value (target holding start threshold value TQ_L) is reached.

For example, as shown in FIG. 4C, when the own vehicle 100 moves to the right side to the desired position of the driver and the driver returns the steering wheel 35 to the neutral position and holds it at that position, the target traveling line Ltgt approaches the own vehicle reference point Pref, the deviation amount D gradually decreases, and the system steering torque TQ_S gradually decreases, so that the driver steering torque TQ_D also gradually decreases, and eventually the target holding start threshold value TQ_L is reached.

The target holding start threshold value TQ_L may be the same value as or different from the target change start threshold value TQ_C, but in this example, the target holding start threshold value TQ_L is set to the same value as the target change start threshold value TQ_C.

When the driver steering torque TQ_D decreases and reaches the target holding start threshold value TQ_L, the vehicle driving support device 10 stops changing the position of the target traveling line Ltgt and holds the target traveling line Ltgt at the current position.

For example, when the driver steering torque TQ_D decreases and reaches the target holding start threshold value TQ_L, the vehicle driving support device 10 stops changing the position of the target traveling line Ltgt and holds the target traveling line Ltgt at the current position as shown in FIG. 4D.

Accordingly, the driver can cause the own vehicle 100 to travel at a position on the right side or a position on a left side of the lane center line LNC with a relatively small driver steering torque TQ_D, and can also recognize that the lane keeping control is being executed since the system steering torque TQ_S larger than zero is output from the steering device 23.

After that, when the driver is causing the own vehicle 100 to travel at a position on the right side or a position on a left side from the lane center line LNC (original target traveling line Ltgt), the driver may wish to cause the own vehicle 100 to travel at a center position of the current lane LN.

When the driver attempts to cause the own vehicle 100 to travel at the center position of the current lane LN, the driver applies torque in the same direction as the system steering torque TQ_S to the steering wheel 35. Therefore, the driver steering torque TQ_D decreases. In addition, the own vehicle reference point Pref approaches the target traveling line Ltgt, so that the driver steering torque TQ_D decreases.

However, even when the driver does not attempt to cause the own vehicle 100 to travel at the center position of the current lane LN, the own vehicle reference point Pref may approach the target traveling line Ltgt, and even at this time, the driver steering torque TQ_D decreases.

Therefore, even when the driver steering torque TQ_D decreases, the vehicle driving support device 10 holds the position of the target traveling line Ltgt until the driver steering torque TQ_D reaches a predetermined value (target change end threshold value TQ_E).

For example, as shown in FIG. 5A, even when the driver steering torque TQ_D decreases and the own vehicle reference point Pref approaches the target traveling line Ltgt, when the driver steering torque TQ_D is larger than the target change end threshold value TQ_E, the vehicle driving support device 10 holds the position of the target traveling line Ltgt at that time.

The target change end threshold value TQ_E is set to a value smaller than the target holding start threshold value TQ_L.

On the other hand, when the driver steering torque TQ_D decreases and reaches the target change end threshold value TQ_E, the vehicle driving support device 10 ends holding the position of the target traveling line Ltgt and starts changing the position of the target traveling line Ltgt. When the vehicle driving support device 10 starts changing the position of the target traveling line Ltgt, the vehicle driving support device 10 changes (returns) the position of the target traveling line Ltgt so that the target traveling line Ltgt gradually moves toward the lane center line LNC.

For example, as shown in FIG. 5B, in the case where the own vehicle 100 is traveling at a position on the right side of the lane center line LNC during the execution of the lane keeping control, when the driver steering torque TQ_D decreases and reaches the target change end threshold value TQ_E, the vehicle driving support device 10 starts changing the position of the target traveling line Ltgt, and changes the position of the target traveling line Ltgt so that the target traveling line Ltgt gradually moves to the left side toward the lane center line LNC.

At this time, the vehicle driving support device 10 sets the position of the lane center line LNC as the target position, and changes the position of the target traveling line Ltgt so that the target traveling line Ltgt reaches the target position.

Further, at this time, the vehicle driving support device 10 sets an appropriate speed (predetermined change speed) as a speed for changing the position of the target traveling line Ltgt, and changes the position of the target traveling line Ltgt at the predetermined change speed. The vehicle driving support device 10 sets the predetermined change speed according to parameters such as the distance between the target traveling line Ltgt that is being changed and the own vehicle reference point Pref and the distance between the target traveling line Ltgt that is being changed and the target position. More specifically, the vehicle driving support device 10 filters parameters such as the distance between the target traveling line Ltgt that is being changed and the own vehicle reference point Pref and the distance between the target traveling line Ltgt that is being changed and the target position by a primary filter, a time variable filter, or the like, to set the predetermined change speed.

Further, at this time, the vehicle driving support device 10 may set an upper limit value of the predetermined change speed, and when the predetermined change speed is larger than the upper limit value, the vehicle driving support device 10 may limit the predetermined change speed to the upper limit value. For example, the vehicle driving support device 10 may limit the predetermined change speed so that the inclination (gradient) of the change in the position of the target traveling line Ltgt with respect to the time axis is equal to or less than a certain inclination. That is, the predetermined change speed may be set so that the shape of the change locus of the position of the target traveling line Ltgt with respect to the time axis becomes a predetermined shape.

Even while the position of the target traveling line Ltgt is being changed in this way, the vehicle driving support device 10 causes the steering device 23 to output the system steering torque TQ_S according to the deviation amount D between the target traveling line Ltgt that is being changed and the own vehicle reference point Pref.

Finally, when the target traveling line Ltgt coincides with the lane center line LNC, the vehicle driving support device 10 ends changing the position of the target traveling line Ltgt and holds the target traveling line Ltgt at that position. Accordingly, after that, the own vehicle 100 travels along the target traveling line Ltgt set in the lane center line LNC.

For example, as shown in FIG. 5C, when the target traveling line Ltgt finally coincides with the lane center line LNC, the vehicle driving support device 10 ends changing the position of the target traveling line Ltgt and holds the target traveling line Ltgt at that position. Accordingly, after that, as shown in FIG. 5D, the own vehicle 100 travels along the target traveling line Ltgt set in the lane center line LNC.

Figure 6:
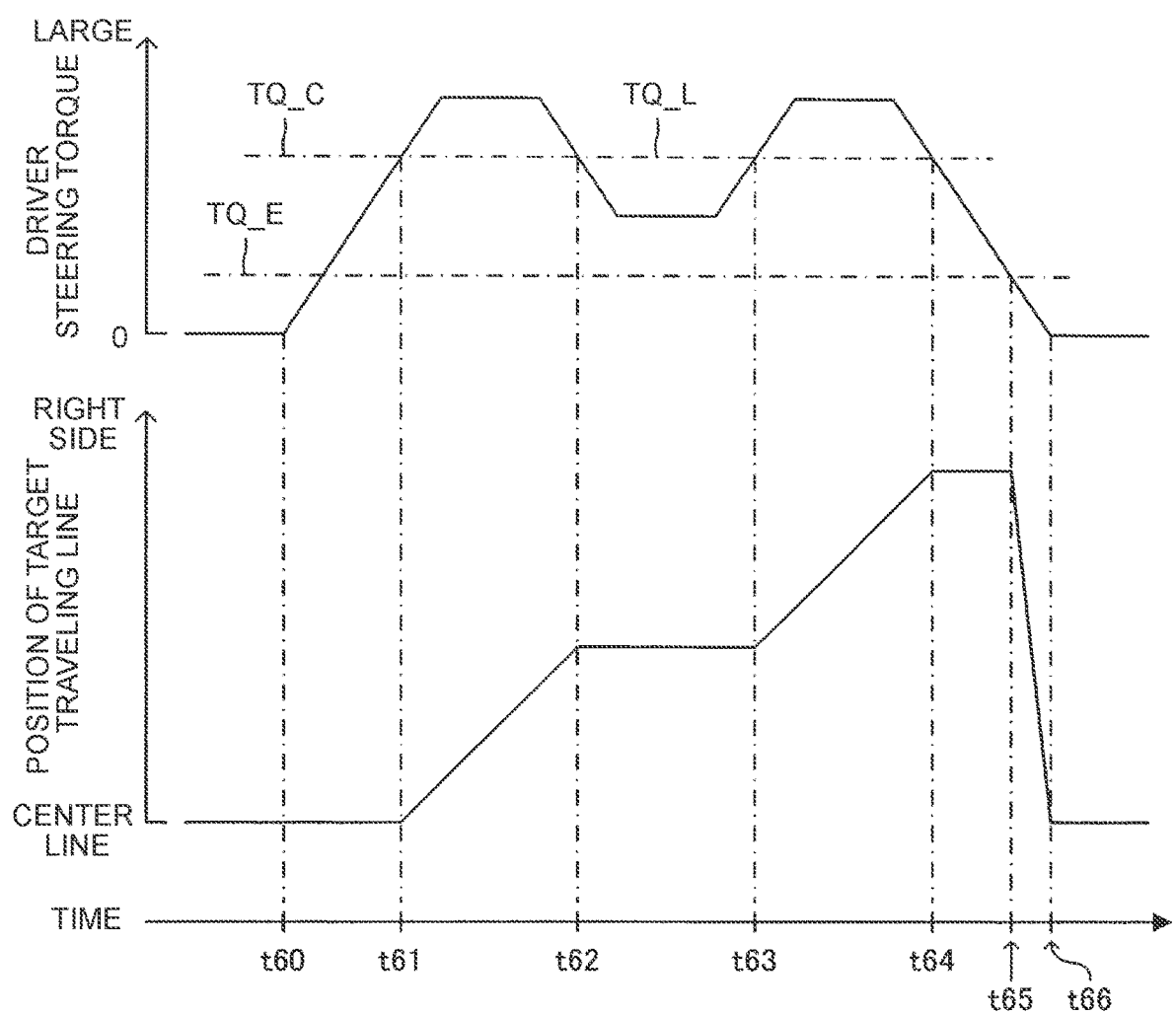
FIG. 6 is a time chart showing changes in the driver steering torque and the target traveling line.

According to the vehicle driving support device 10, for example, as shown in FIG. 6, the position of the target traveling line Ltgt is changed according to the driver steering torque TQ_D.

In the example shown in FIG. 6, the driver steering torque TQ_D starts to increase from time t60. At this time, the target traveling line Ltgt is set at a position coinciding with the lane center line LNC. After that, until the driver steering torque TQ_D reaches the target holding start threshold value TQ_L at time t61, the state in which the driver steering torque TQ_D is smaller than the target change start threshold value TQ_C continues. Therefore, the target traveling line Ltgt is maintained at a position coinciding with the lane center line LNC.

When the driver steering torque TQ_D increases and reaches the target change start threshold value TQ_C at time t61, the position of the target traveling line Ltgt starts to move to the right side, and thereafter, until the driver steering torque TQ_D reaches the target holding start threshold value TQ_L at time t62, the state in which the driver steering torque TQ_D is equal to or larger than the target change start threshold value TQ_C continues. Therefore, the position of the target traveling line Ltgt continues to move to the right side until time t62.

When the driver steering torque TQ_D decreases and reaches the target holding start threshold value TQ_L at time t62, the movement of the target traveling line Ltgt to the right side is stopped, and thereafter, until the driver steering torque TQ_D reaches the target change start threshold value TQ_C at time t63, the state in which the driver steering torque TQ_D is equal to or smaller than the target holding start threshold value TQ_L and is larger than the target change end threshold value TQ_E continues. Therefore, the position of the target traveling line Ltgt is held at the position at time t62 from time t62 to time t63.

After that, when the driver steering torque TQ_D increases and reaches the target change start threshold value TQ_C at time t63, the position of the target traveling line Ltgt starts to move to the right side, and thereafter, until the driver steering torque TQ_D reaches the target holding start threshold value TQ_L at time t64, the state in which the driver steering torque TQ_D is equal to or larger than the target change start threshold value TQ_C continues. Therefore, the position of the target traveling line Ltgt continues to move to the right side until time t64.

When the driver steering torque TQ_D decreases and reaches the target holding start threshold value TQ_L at time t64, the movement of the target traveling line Ltgt to the right side is stopped, and thereafter, until the driver steering torque TQ_D reaches the target change end threshold value TQ_E at time t65, the state in which the driver steering torque TQ_D is equal to or smaller than the target holding start threshold value TQ_L and is larger than the target change end threshold value TQ_E continues. Therefore, the position of the target traveling line Ltgt is held at the position at time t64 from time t64 to time t65.

When the driver steering torque TQ_D further decreases and reaches the target change end threshold value TQ_E at time t65, the position of the target traveling line Ltgt starts to move to the left side, and thereafter, until the target traveling line Ltgt coincides with the lane center line LNC at time t66, the position of the target traveling line Ltgt continues to move to the left side.

When the target traveling line Ltgt coincides with the lane center line LNC at time t66, the movement of the target traveling line Ltgt is stopped.

Effects

The above is the outline of the operation of the vehicle driving support device 10. According to this, when the own vehicle 100 is laterally moved from the target traveling line Ltgt by the driver during the execution of the lane keeping control, the target traveling line Ltgt moves from the lane center line LNC in the same direction, so that the driver steering torque TQ_D that is required when the own vehicle 100 is caused to travel straight at a position desired by the driver becomes smaller. Further, when the own vehicle 100 is caused to travel straight at the position desired by the driver, the target traveling line Ltgt is set between the lane center line LNC and the own vehicle reference point Pref. At this time, since the system steering torque TQ_S is applied to the own vehicle 100 to some extent due to the lane keeping control, the driver can easily recognize that the lane keeping control is being executed.

Therefore, the vehicle driving support device 10 can make it easier for the driver to recognize that the lane keeping control is being executed when the driver is causing the own vehicle 100 to travel at a position on the right side or a position on the left side of the lane center line LNC during the execution of the lane keeping control, and can also relatively reduce the driver steering torque TQ_D required of the driver.

Specific Operation of Vehicle Driving Support Device

Figure 7:
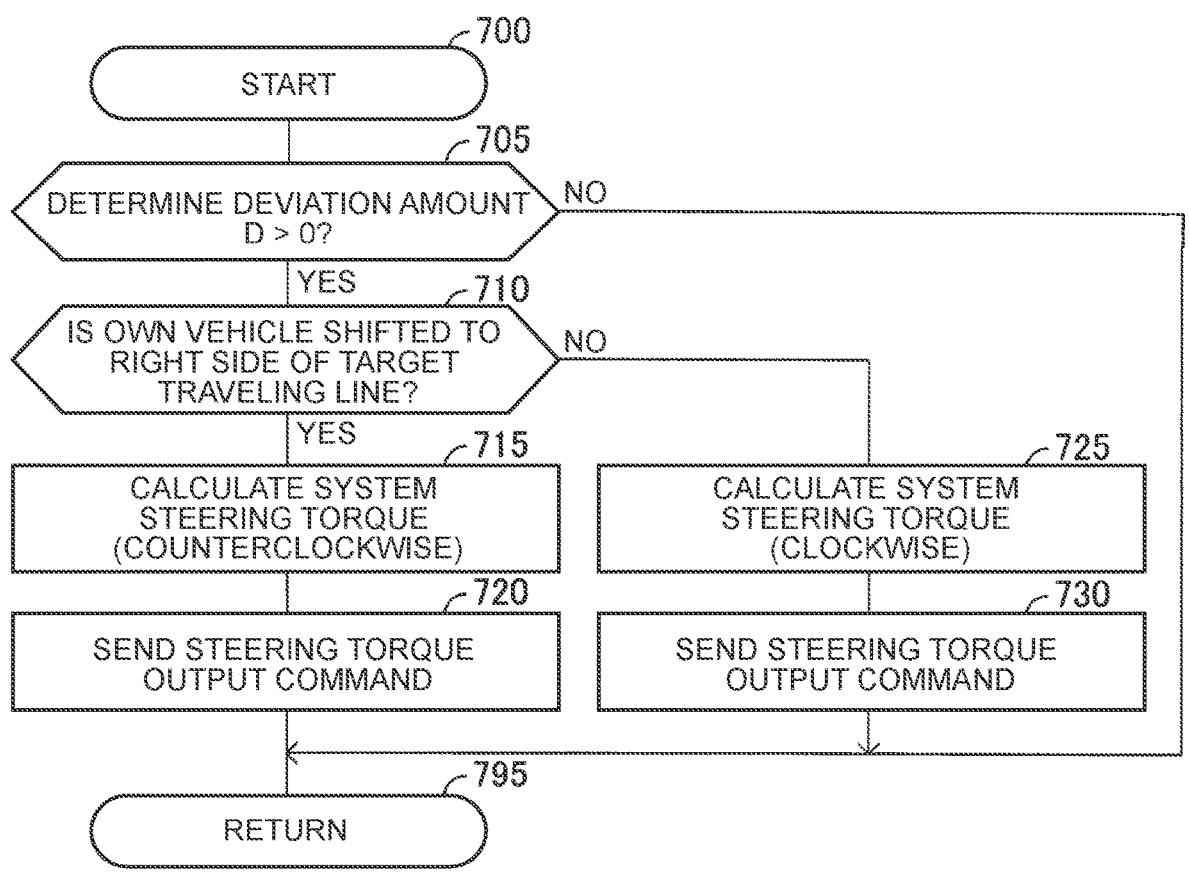
FIG. 7 is a flowchart showing a routine executed by the vehicle driving support device according to the embodiment of the present disclosure.

Next, the specific operation of the vehicle driving support device 10 will be described. When the CPU of the ECU 90 of the vehicle driving support device 10 is requested to execute the lane keeping control, the CPU executes the routine shown in FIG. 7 at a predetermined calculation cycle. Thus, at a predetermined timing, the CPU starts the process from step 700 of the routine shown in FIG. 7, and advances the process to step 705 to determine whether the deviation amount D is larger than zero.

When the CPU determines "Yes" in step 705, the process proceeds to step 710 and the CPU determines whether the own vehicle reference point Pref is shifted to the right side of the target traveling line Ltgt.

When the CPU determines "Yes" in step 710, the process proceeds to step 715 and the CPU calculates the system steering torque TQ_S required to turn the own vehicle 100 to the left direction and to return the own vehicle reference point Pref to the target traveling line Ltgt. Next, the CPU advances the process to step 720, sends a steering torque output command to the steering device 23, and causes the steering device 23 to output the system steering torque TQ_S calculated in step 715. Subsequently, the CPU advances the process to step 795 to temporarily end the processes of this routine.

On the other hand, when the CPU determines "No" in step 710, the process proceeds to step 725 and the CPU calculates the system steering torque TQ_S required to turn the own vehicle 100 to the right direction and to return the own vehicle reference point Pref to the target traveling line Ltgt. Next, the CPU advances the process to step 730, sends a steering torque output command to the steering device 23, and causes the steering device 23 to output the system steering torque TQ_S calculated in step 725. Subsequently, the CPU advances the process to step 795 to temporarily end the processes of this routine.

On the other hand, when the CPU determines "No" in step 705, the CPU directly advances the process to step 795 to temporarily end the processes of this routine.

Figure 8:
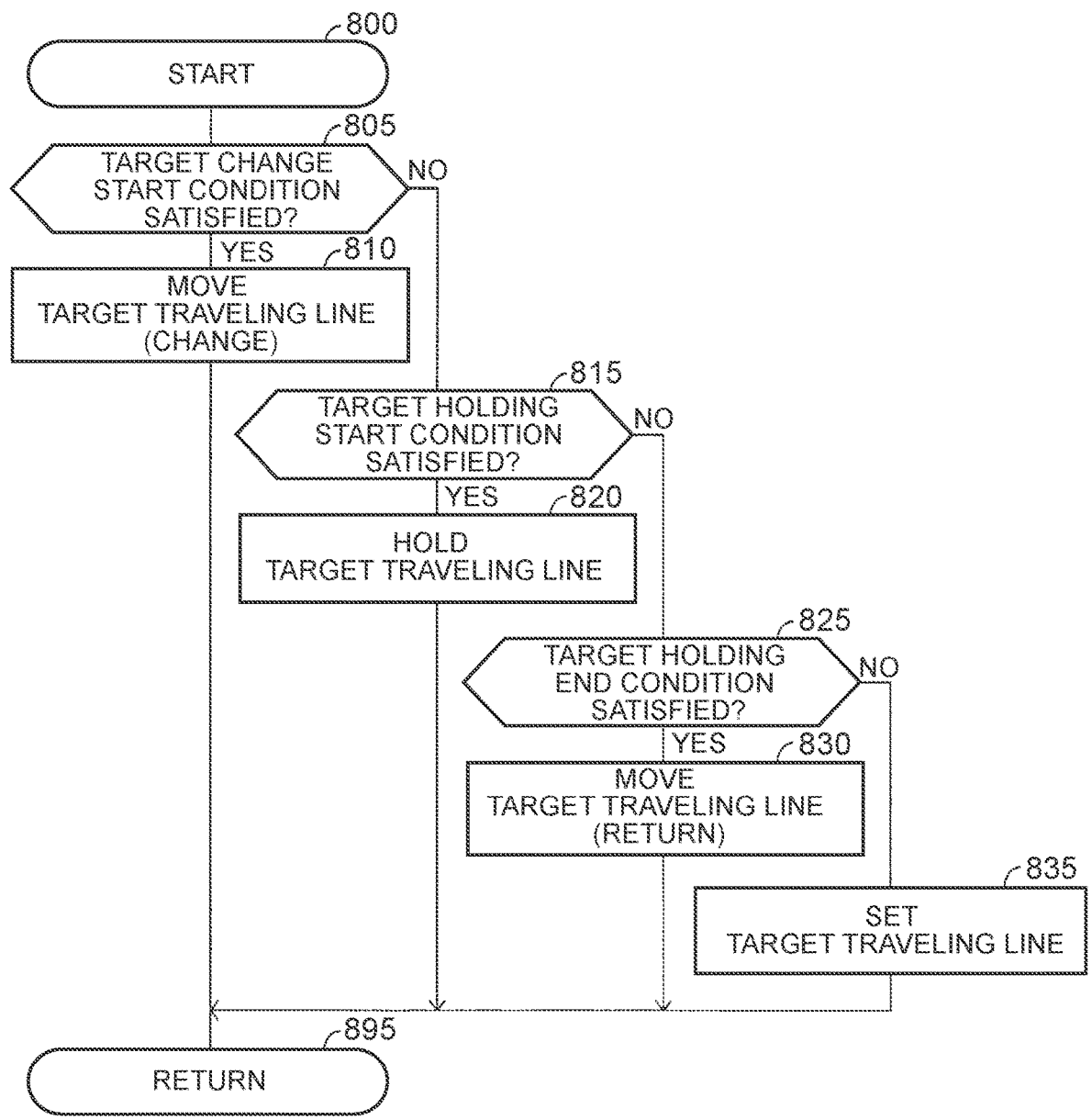
FIG. 8 is a flowchart showing a routine executed by the vehicle driving support device according to the embodiment of the present disclosure.

When the CPU is requested to execute the lane keeping control, the CPU further executes the routine shown in FIG. 8 at a predetermined calculation cycle. Thus, at a predetermined timing, the CPU starts the process from step 800 of the routine shown in FIG. 8, and advances the process to step 805 to determine whether the target change start condition is satisfied. The target change start condition is a condition that the driver steering torque TQ_D is equal to or larger than the target change start threshold value TQ_C.

When the CPU determines "Yes" in step 805, the process proceeds to step 810, and the position of the target traveling line Ltgt is changed so that the target traveling line Ltgt moves toward the own vehicle reference point Pref. Subsequently, the CPU advances the process to step 895 to temporarily end the processes of this routine.

On the other hand, when the CPU determines "No" in step 805, the CPU advances the process to step 815 to determine whether the target holding start condition is satisfied. The target holding start condition is a condition that, after the driver steering torque TQ_D becomes equal to or larger than the target change start threshold value TQ_C, the driver steering torque TQ_D decreases to reach the target holding start threshold value TQ_L, and the driver steering torque TQ_D is equal to or smaller than the target holding start threshold value TQ_L and is larger than the target change end threshold value TQ_E.

When the CPU determines "Yes" in step 815, the process proceeds to step 820, and the position of the target traveling line Ltgt is held at the position at the time when the driver steering torque TQ_D decreases and reaches the target holding start threshold value TQ_L. Subsequently, the CPU advances the process to step 895 to temporarily end the processes of this routine.

On the other hand, when the CPU determines "No" in step 815, the CPU advances the process to step 825 to determine whether the target holding end condition is satisfied. The target holding end condition is a condition that the driver steering torque TQ_D decreases to reach the target change end threshold value TQ_E, the driver steering torque TQ_D continues to be equal to or smaller than the target change end threshold value TQ_E, and the target traveling line Ltgt does not coincide with the lane center line LNC.

When the CPU determines "Yes" in step 825, the process proceeds to step 830, and the position of the target traveling line Ltgt is changed so that the target traveling line Ltgt coincides with the lane center line LNC. Subsequently, the CPU advances the process to step 895 to temporarily end the processes of this routine.

On the other hand, when the CPU determines "No" in step 825, the process proceeds to step 835, and the target traveling line Ltgt is set so that the target traveling line Ltgt coincides with the lane center line LNC. Subsequently, the CPU advances the process to step 895 to temporarily end the processes of this routine.

The above is the specific operation of the vehicle driving support device 10.

The present disclosure is not limited to the above embodiment, and various modifications can be adopted within the scope of the present disclosure.

What is claimed is:

1. A vehicle driving support device comprising:
an electronic control unit (ECU) configured to:
execute lane keeping control in which an own vehicle is autonomously steered such that the own vehicle travels within a current lane,
during execution of the lane keeping control, set a center line passing through a center of a travelable width of the own vehicle within the current lane as a target traveling line, autonomously steer the own vehicle such that a reference point of the own vehicle moves along the target traveling line,
change a position of the target traveling line such that the target traveling line is a line located between the center line and the reference point of the own vehicle,
steer when a driver performs a steering operation for the own vehicle during the execution of the lane keeping control and when a steering operation force of the driver becomes equal to or larger than a target change start threshold value,
change a position of the target traveling line such that the target traveling line coincides with the center line,
when the steering operation force of the driver becomes equal to or larger than the target change start threshold value, start a change of the position of the target traveling line, and then the steering operation force of the driver becomes equal to or smaller than a target change end threshold value,
stop changing the position of the target traveling line and hold the position of the target traveling line at a position at a time when the steering operation force decreases to a target holding start threshold value, and
when the steering operation force of the driver becomes equal to or larger than the target change start threshold value, start a change of the position of the target traveling line, and then the steering operation force decreases to the target holding start threshold value, and
steer the own vehicle based on the execution of the lane keeping control and the steering force of the driver.

2. The vehicle driving support device according to claim 1,
wherein the ECU is configured to;
change the position of the target traveling line such that the target traveling line coincides with the center line,
in a case where the steering operation force becomes equal to or smaller than a target change end threshold value that is set to a value smaller than the target holding start threshold value when the steering operation force decreases to the target holding start threshold value, hold the position of the target traveling line at the position at a time when the steering operation force decreases to the target holding start threshold value.

* * * * *